United States Patent
Zickar et al.

[15] 3,657,808
[45] Apr. 25, 1972

[54] METHODS OF CONSTRUCTING ELECTRICAL COILS

[72] Inventors: Frank R. Zickar; Frank W. Benke; James L. Rotruck, all of Sharon, Pa.

[73] Assignee: Westinghouse Electric Corporation, Pittsburgh, Pa.

[22] Filed: Aug. 21, 1970

[21] Appl. No.: 65,983

[52] U.S. Cl. ................................... 29/605, 29/602, 336/206
[51] Int. Cl. ........................................................... H01f 7/06
[58] Field of Search .................. 29/605, 602, 631; 336/199, 336/205, 206, 208

[56] References Cited

UNITED STATES PATENTS

| 736,177 | 8/1903 | Varley | 336/206 |
|---|---|---|---|
| 1,036,935 | 8/1912 | Underhill | 336/206 |
| 3,071,845 | 1/1963 | Leonard et al. | 336/206 X |
| 3,386,058 | 5/1968 | Michel | 336/206 X |

Primary Examiner—John F. Campbell
Assistant Examiner—Carl E. Hall
Attorney—A. T. Stratton, F. E. Browder and Donald R. Lackey

[57] ABSTRACT

A method of constructing electrical coils of the cylindrical type for high temperature dry type transformers, wherein the coil collars are formed of a plurality of first and second plies of insulating materials stacked in a predetermined sequence to a predetermined build dimension. At least the first plies are impregnated with a thermosettable resin which has been advanced to an intermediate state, still fusible but dry to the touch, and which is subsequently cured to a solid infusible state to consolidate the collars into unitary laminated assemblies.

9 Claims, 6 Drawing Figures

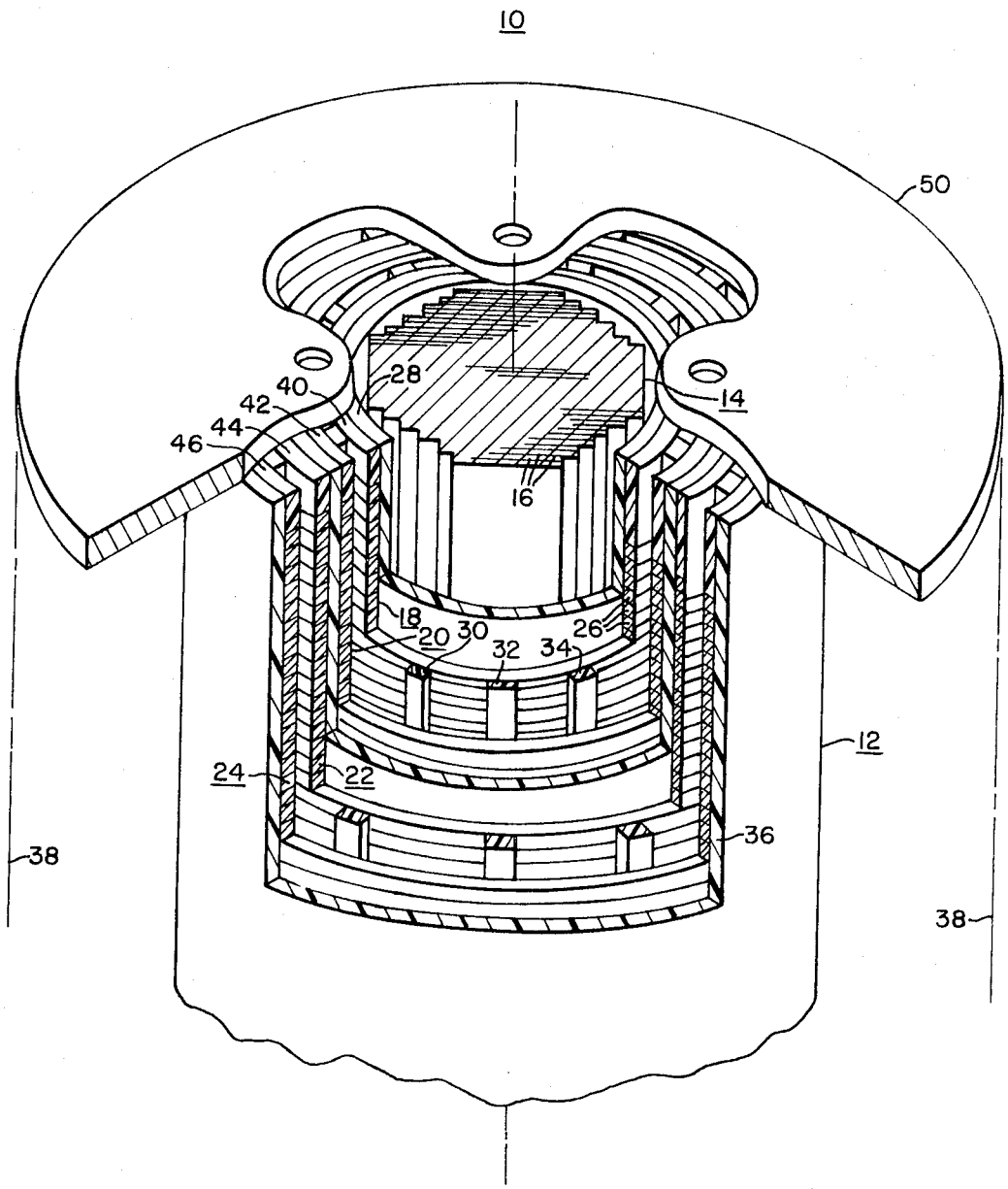
FIG. I
INVENTORS
James L. Rotruck,
Frank W. Benke &
Frank R. Zickar

3,657,808

METHODS OF CONSTRUCTING ELECTRICAL COILS

BACKGROUND OF THE INVENTION

1. Field of the Invention

The invention relates in general to methods of constructing electrical coils, and more specifically to methods of constructing electrical coils of the cylindrical type for high temperature, dry type transformers.

2. Description of the Prior Art

Electrical windings having a plurality of concentrically disposed, cylindrical type coils such as those used in certain types of high temperature, dry type electrical power transformers, utilize insulating structures or collars at each end of a coil or layer of turns of the winding. The insulating collars have substantially the same width dimension as the insulated conductor from which each cylindrical coil is formed, and the collars extend from each end of the coil to pressure rings located at the ends of the winding assembly. The insulating collars not only provide electrical insulation between the coils and the pressure rings, but they must have an extremely high strength in compression as they prevent axial movement of the coils due to short circuit mechanical stresses. Further, adequate electrical and mechanical strength must be maintained at elevated operating temperatures, such as 220° C.

In the prior art, it is common to use pre-formed insulating collars, such as those formed by cutting tubular members which have been formed of cellulosic insulation, or inorganic insulating materials. This approach, however, requires costly winding tube facilities in order to provide the many different diameters of insulating tubular members required, from which the collars for each coil or layer of the cylindrical winding are cut; it generates costly scrap; and, pre-formed collars are difficult to use because of the manufacturing tolerances in both the manufacture of the tubular members and the manufacture of the electrical coils for each layer of the cylindrical winding.

Thus, it would be desirable to provide a new and improved method of constructing electrical coils of the cylindrical type for high temperature dry type power transformers, which facilitates the manufacturing of the coils and their insulating collars without deleteriously affecting the insulating and/or mechanical strength of the collars, and without an offsetting increase in the cost of the collar material.

SUMMARY OF THE INVENTION

Briefly, the present invention is a new and improved method of constructing electrical coils or windings of the cylindrical type for dry type power transformers having insulating collars disposed at each end of each coil in a winding. The method includes forming the insulating collar by cutting a plurality of first plies from a fibrous sheet of insulating material which is impregnated with a thermosettable resin advanced to the B-stage, i.e., a fusible state dry to the touch, and a plurality of second plies cut from a sheet of asbestos. The first and second plies are stacked in a predetermined sequence to a predetermined build dimension, and the resulting stack is wrapped about the coil form and held in place with tape. After the coil or wing assembly is completed in this manner, including all layers of turns and the collars at the ends of these collars, the assembly is heated to cure the fusible resin to a solid, infusible state, which consolidates the collars into unitary assemblies having the required electrical insulating qualities and mechanical strength in the operating temperature range of dry type power transformers.

BRIEF DESCRIPTION OF THE DRAWINGS

The invention may be more readily understood when considered in view of the following detailed description of exemplary embodiments thereof, taken with the accompanying drawings, in which:

FIG. 1 is a fragmentary, perspective view, partially cut away, of a power transformer having a low voltage winding which may be constructed according to the teachings of the invention;

DESCRIPTION OF PREFERRED EMBODIMENTS

Figure 2A:
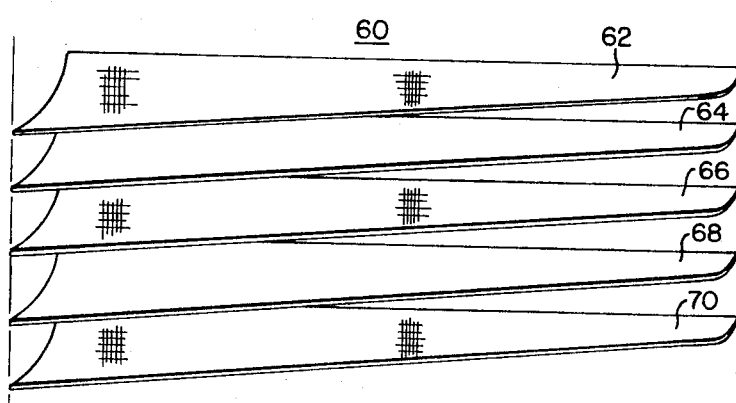
FIGS. 2A, 2B and 2C are exploded, side and end elevational views, respectively, of an insulating collar illustrating the construction thereof according to the teachings of the invention.

Referring now to the drawings, and FIG. 1, in particular, there is shown a fragmentary, perspective view of a power transformer 10 of the dry type, having a low voltage winding 12 which may be constructed according to the teachings of the invention. The transformer 10 may be single or polyphase, with only a portion of one winding leg of the transformer being illustrated, as additional winding legs would be similarly constructed.

Transformer 10 includes a winding leg 14 of a magnetic core of the core-form type, having a plurality of stacked metallic, magnetic laminations 16 which may be cut and arranged to form a cruciform cross-sectional configuration, as illustrated, to accommodate windings having circular openings therein.

Low voltage winding 12 is of the cylindrical type, having a plurality of concentrically disposed cylindrical coils 18, 20, 22 and 24 each of which have a plurality of conductor turns formed of an insulated conductor, such as turns 26 of coil 18. Low voltage winding 12 is separated from leg member 14 of the magnetic core by an insulating tube 28, which may be the winding form on which the first coil 18 was wound, with subsequent coils being separated by layer insulation, which may include spacer members, such as spacer members 30, 32 and 34 disposed between coils 18 and 20, for forming cooling ducts for the flow of cooling air. High-low insulation 36 is disposed about the outermost coil 24 of the low voltage winding 12, and a high voltage winding 38, shown in phantom, is concentrically disposed about the low voltage winding 12. The high voltage winding 38 will usually include a plurality of axially spaced pancake type coils, braced between the pressure rings disposed at opposite ends of the winding assembly by circumferentially spaced insulating members.

Each of the coils of the low voltage winding 12 have insulating collars disposed at their axial ends, with coils 18, 20, 22 and 24 having insulating collars 40, 42, 44 and 46, respectively, disposed at their upper axial ends and similar insulating collars at their lower axial ends.

The insulating collars are disposed between the axial ends of the coils and pressure rings disposed at each end of the high and low voltage assembly, such as pressure ring 50 disposed at the upper axial end of the assembly. Pressure ring 50 may be metallic, or it may be formed of an insulating material, with a suitable insulating material and construction being disclosed in U.S. Pat. No. 3,467,932, which is assigned to the same assignee as the present application.

As hereinbefore stated, the high voltage winding shown generally at 38 is also mechanically supported between the pressure rings at the ends of the winding assembly, such as by spaced insulating support columns which extend from the ends of the high voltage winding to the pressure rings.

The construction of the insulating collars at the ends of the cylindrical coils in the low voltage winding 12 is very important, as the collars must withstand high operating temperatures, and electrical and mechanical stresses across the operating temperature range of the winding without failure. For example, the peak normal operating temperature of certain types of dry type power transformers is 220° C, and the collars must withstand this temperature while maintaining adequate electrical insulation strength for the electrical potentials involved, and while maintaining a high compressive strength to prevent axial movement of the coils during short circuit mechanical stresses. Further, the collars should not absorb moisture during cooling from elevated operating temperatures to ambient, and they should be constructed in a manner which facilitates the manufacturing of the collars and associated electrical coils, and they should be formed of a relatively low cost material.

Collars formed wholly of inorganic materials may absorb moisture when the transformer is cooled to ambient temperature, deleteriously affecting the electrical strength. Preformed collars, such as those cut from tubular members formed of a plurality of layers of insulating material are difficult to assemble due to manufacturing tolerances of the collar and coil dimensions. Further, the pre-formed collar requires tube winding facilities. Laminated collars formed wholly of synthetic paper, the layers of which are bonded together when the winding assembly is dipped in a varnish after it is manufactured, are unattractive from an economic viewpoint, due to the relatively high cost of the materials.

The present invention discloses a method of constructing an electrical winding assembly for high temperature dry type power transformers having coils of the cylindrical type, which overcomes the disadvantages of the prior art, including insulating collars constructed of a relatively low cost material which maintain a power factor within the allowable range over the operating temperature range of the transformer, which maintain a high compressive strength over the operating temperature range, and which facilitate the assembly of the winding.

Figures 2B, 2C:

More specifically, FIGS. 2A, 2B and 2C illustrate an exploded view, and side and end elevational views, respectively, of an insulating collar 60 constructed according to the teachings of the invention, which may be used in the construction of the low voltage winding 12 shown in FIG. 1.

Collar 60, as illustrated in the exploded view thereof in FIG. 2A, includes a plurality of insulating plies, such as plies 62, 64, 66, 68 and 70. which are stacked or superposed to form the structure shown in the side and end elevational views of collar 60 in FIGS. 2B and 2C, respectively.

Certain of the plies are cut to a predetermined configuration from a web of sheet of fibrous insulating material, such as glass fibers, or wholly aromatic polyamide fibers, in cloth, paper or mat form, which sheet is impregnated with a thermosettable resin composition whose cure has been advanced to the B-stage. In the B-stage the resin is still fusible but dry to the touch, requiring further heat to effect a final cure to form a non-soluble, non-fusible solid. The impregnating resin used must withstand the high operating temperatures of dry type power transformers without appreciable loss of electrical and mechanical strength, with the methylene bridged diphenyl oxide polymers being excellent. Polymers of this type are described in U.S. Pats. No. 3,323,962 and 3,405,091, which are assigned to the same assignee as the present application.

The remaining plies of collar 60 shown in FIG. 2A are cut to the same configuration as the resin impregnated plies, from a sheet of asbestos. The asbestos plies will withstand the high operating temperatures of dry type that they have the desired electrical insulating characteristics, and asbestos is relatively low in initial cost. Asbestos paper 0.062 inches thick, weighing about 2.3 pounds per square yard has been found to be suitable, but other thicknesses and densities may be used. The asbestos plies are used as filler material in the collar to reduce its overall cost, but they must be protected from the atmosphere to prevent their absorbing moisture during the cooling of the transformer to ambient temperatures. Therefore, in the selection of the resin impregnated plies and asbestos plies, it is critical that the two outermost plies, such as plies 62 and 70 in FIG. 2A, be cut from the resin impregnated material. The plies adjacent the outermost plies, i.e., plies 64 and 68, are cut from the asbestos, and ply 66 is cut from the resin impregnated material. Thus, in this example, the plies are alternated, with the outermost plies being the resin impregnated plies, and alternate plies being cut from an asbestos sheet. While the plies are shown being alternated in FIG. 2A, it is to be understood that in developing the build dimension required for the collar 60, that more than one ply of the same material may be stacked together. For example, the first ply 62 may actually be two or more plies of the same material.

In selecting the thickness dimension of the resin impregnated plies and the thickness dimension of the asbestos plies, the resin impregnated plies should be thin relative to the asbestos plies, in order to provide a low-cost structure, since the asbestos has a substantially lower cost. Excellent collars have been constructed using asbestos plies cut from a sheet having a thickness dimension of 0.062 inches, and resin impregnated plies from a sheet having a thickness dimension of 0.012 inches, but other thickness dimensions may be used consistent with obtaining a collar which has a substantial amount of asbestos reinforced by the resin impregnated material.

The total number of plies in the laminated collar will depend upon the width of the conductor used to wind the associated electrical coils, as the thickness dimension of the insulating collars should substantially match the radial thickness dimension of the coil turns.

The method of constructing an electrical winding according to the teachings of the invention will now be described, with the basic steps of the method being shown in the block diagram of FIG. 3.

Figure 3:
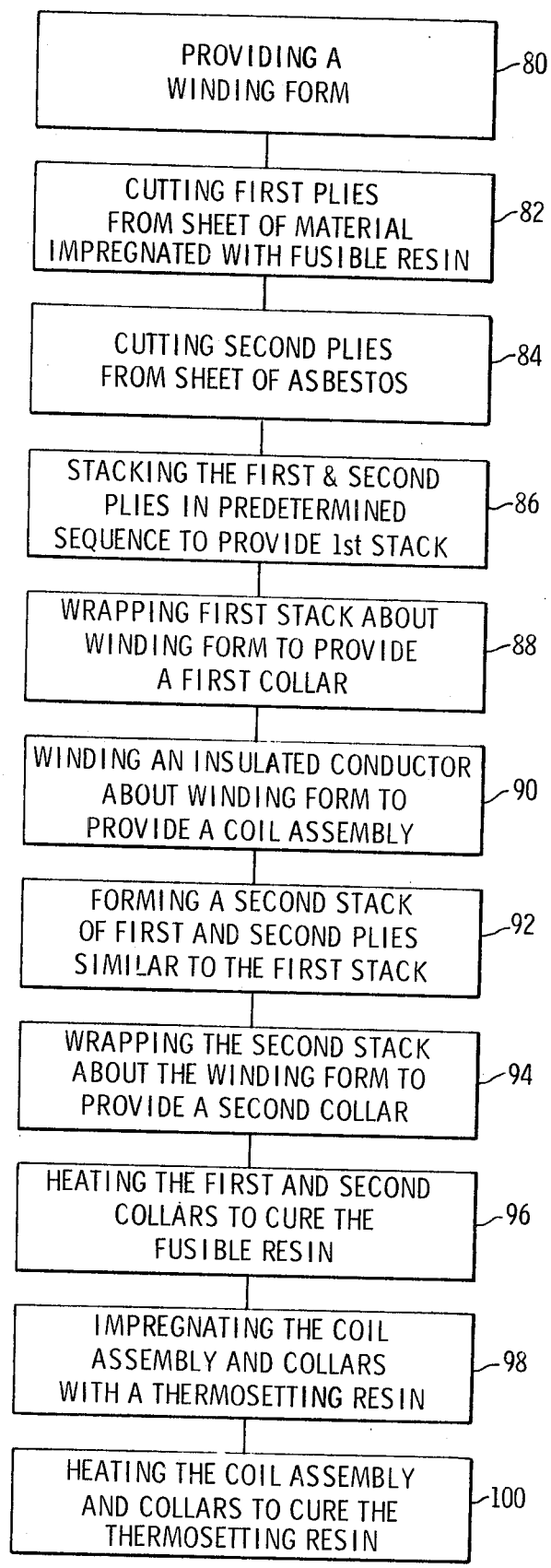
FIG. 3 is a block diagram illustrating the steps of constructing an electrical winding according to the teachings of the invention.

The first step of the method, illustrated by block 80 in FIG. 3, is to provide a winding form, such as the winding tube 28 shown in FIG. 1. This winding form may form a part of the completed winding in some applications, and in other applications the winding form is removed after the complete winding assembly has been wound.

The next step, shown in block 82, is to cut a plurality of first plies of like predetermined configuration from a fibrous sheet of insulating material which has been impregnated with a thermosettable resin, with the resin having been advanced to the heat fusible B-stage, which is dry to the touch. As shown most clearly in FIG. 2B, collar 60 has first and second sides 59 and 61, and first and second ends 63 and 65. The predetermined configuration is such that side 61 tapers inwardly toward side 59, starting with a maximum separation at end 63 and a minimum separation from side 59 at end 65. This taper is necessary in order to start the winding of the associated coil with the desired angle of the conductor turns with respect to a plane disposed perpendicular to the longitudinal axis of the winding mandrel.

As illustrated by block 84 in FIG. 3, the next step of the method is to cut a plurality of second plies having the same configuration and dimensions as the first plies, with the second plies being cut from a sheet of asbestos.

The next step, illustrated by block 86, is to stack the first and second plies in a predetermined sequence, to provide a first stack having a build dimension substantially equal to the thickness dimension of the conductor of which the associated coil is formed. The predetermined sequence includes first plies disposed on each end of the stack, in order to provide a moisture barrier, preventing moisture from migrating through the collar to the asbestos plies. The step of stacking the first and second plies is also illustrated in FIG. 2A, which has been hereinbefore described.

Figure 4:
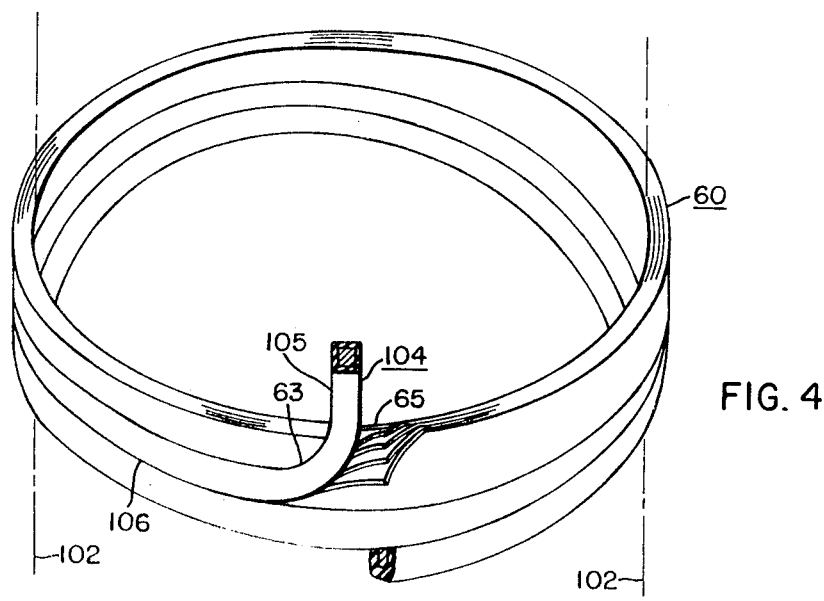
FIG. 4 is a fragmentary, perspective view of the insulating collar shown in FIGS. 2A, 2B and 2C, illustrating the collar at another stage of its assembly.

The first stack of plies, after stacking, is flexible, and the stack is wrapped about the winding form and secured thereto by a high temperature tape, such as a glass tape, to provide a first collar, which step of the method is indicated by block 88. This step is also illustrated in a perspective view of collar 60 shown in FIG. 4. The winding form in FIG. 4 is indicated generally by the dot-dash lines 102. It will be noted in FIG. 4 that the length dimension of the plies is selected to provide a gap between ends 63 and 65 of the collar after it has been wrapped about the winding form, which gap is sized to snuggly receive the conductor 104 of which the coil is formed. Thus, a lead 105 to the coil may be formed prior to directing the conductor 104 through the gap in the collar. The ends 63 and 65 of collar 60 are preferably curved to accommodate the bend in the conductor 104 between the lead 105 and the start of the first turn 106 of the electrical coil. In wrapping the collar 60 about the winding form, side 59 of the collar is placed perpendicular to the longitudinal axis of the winding mandrel, which will then automatically align the tapered side 59 of the collar to start the desired winding angle for the conductor turns. The collar 60, in this stage of manufacture, provides sufficient strength to place the conductor 104 tightly against side 61 at the start of the winding operation for positive location. The plies at end 65 of collar 60 are shown folded over slightly in FIG. 4, indicating that the plies are not bonded together at this stage of the method.

The next step of the method, indicated by block 90 in FIG. 3, and also in FIG. 4, is to wind an insulated conductor, such as conductor 104 shown in FIG. 4, about the winding form to provide a coil assembly having first and second ends, with the first end including the lead 105 which is formed through the gap in the collar 60, and also the first conductor turn 106 at the first end of the coil.

A second stack of first and second plies are then provided, similar to the first stack, with this step of the method being indicated with block 92, and then, as indicated by block 94, the second stack is wound about the winding form to provide a second collar at the second end of the coil which is held in position by tape. The lead to the coil at the second end of the coil is formed in a manner similar to that illustrated in FIG. 4, upon completion of winding the turns of the coil.

Any subsequent coils in the winding assembly are manufactured as hereinbefore described relative to the first coil, except the winding form for subsequent coils will now be the preceding coil instead of the winding tube. The construction is clearly illustrated in FIG. 1, with layer insulation being disposed between the various coils, and duct formers being disposed between predetermined coils to form cooling ducts through the winding assembly.

After the desired number of coils are wound, the winding assembly is heated, indicated by block 96, which step of the method causes the fusible resin in the first plies of the coil collars to flow slightly and then cure to an infusible solid, bonding the plies into a unitary high strength laminated structure. This heating step is ordinarily required for windings of this type, to drive out moisture which may have been absorbed by the various insulating materials during the manufacturing stage of the winding, and it thus simultaneously completes the curing of the thermosettable resin impregnated first plies. The temperature, and time at temperature, of this heating step will depend upon the specific impregnant used, with a temperature of 200°–250° C. For about 15–45 minutes being adequate for the methylene bridged diphenyl oxide polymers.

Following the heating step which cures the resin in the collar to an infusible solid, and also drives out moisture from the winding assembly, the winding assembly is immediately impregnated with a thermosettable resin, composition, such as by dipping the entire assembly into a bath of resin, with this step being indicated by block 98. After the entire assembly is impregnated with the thermosettable resin, the assembly is heated, indicated by block 100, to cure the resin to an infusible solid. This final overcoat of thermosetting resin seals the exposed edges of the asbestos plies in the coil collars, preventing them from absorbing moisture along the edges of the collars, it provides a glossy finish to which dirt will not readily adhere, it adds to the mechanical strength of the coil assembly, and it also impregnates any asbestos to asbestos layers in the collar, bonding them together, in those collars in which resin impregnated plies are not alternated with asbestos plies.

Collars were constructed according to the teachings of the invention, using plies formed of 0.012 inch thick glass fiber cloth impregnated with a methylene bridged diphenyl oxide polymer, and plies formed of 0.062 inch thick asbestos, and tested for compressive strengths and also for power factor, with the latter being tested at different temperatures across the operating temperature range of typical high temperature dry type power transformers. The results are listed in Table I.

TABLE I

| | | Sample 1 | Sample 2 | Sample 3 | Sample 4 |
|---|---|---|---|---|---|
| Power Factor % | Ambient | 0.38 | 0.63 | 0.48 | 0.40 |
| | 100°C. | 0.51 | 1.01 | 0.67 | 0.73 |
| | 125°C. | 1.35 | 1.86 | 1.60 | 1.81 |
| | 150°C. | 3.95 | 4.62 | 4.09 | 5.43 |
| | 200°C. | 12.80 | 8.68 | 9.81 | 10.40 |
| | 225°C. | 22.4 | 23.00 | 28.10 | 45.50 |
| | 250°C. | 11.5 | 9.41 | 16.00 | 16.00 |
| Compressive strength (PSI) | | 12,545 | 14,873 | 14,232 | 13,372 |

In Table I, samples 1 and 2 were constructed by stacking two plies of the resin impregnated materials, one ply of asbestos, two plies of the resin impregnated material, one ply of asbestos, and two plies of the resin impregnated material. Samples 3 and 4 were constructed by stacking three plies of the resin impregnated material, two plies of asbestos, and three plies of the resin impregnated material. It will be noted from Table I that the compressive strengths are excellent, and the power factor, even at elevated temperatures, is within the allowable range for dry type, high temperature power transformers.

The results listed in Table I are even more remarkable when compared with tests performed on experimental collars constructed of wholly aromatic polyamide paper and asbestos plies, with no pre-impregnation of the wholly aromatic polyamide paper. The strength of these collars was obtained, according to the teachings of the prior art, through the final varnish dip of the entire assembly. The experimental collars constructed to obtain a comparison with the collars according to the teachings of the invention utilize 0.030 inch thick plies formed of wholly aromatic polyamide paper, and 0.062 inch thick asbestos, with the results of power factor and compression tests being listed in Table II.

TABLE II

| | | Sample 1 | Sample 2 | Sample 3 | Sample 4 |
|---|---|---|---|---|---|
| Power Factor % | Ambient | 0.59 | 0.58 | 0.60 | 0.59 |
| | 100°C. | 0.76 | 1.03 | 0.97 | 0.77 |
| | 125°C. | 1.51 | 1.80 | 1.46 | 1.15 |
| | 150°C. | 1.46 | 2.59 | 2.65 | 2.69 |
| | 200°C. | 20.72 | 25.00 | 13.60 | 13.90 |
| | 225°C. | 10.72 | 25.50 | 20.60 | 18.10 |
| | 250°C. | 36.23 | 17.20 | 10.10 | 12.20 |
| Compressive Strength (PSI) | | 8,376 | 7,594 | 3,884 | 4,400 |

Samples 1 and 2 in Table II were constructed by stacking the wholly aromatic polyamide paper plies and asbestos plies alternately, starting with the ply of the wholly aromatic polyamide paper, and using a total of five plies. Samples 3 and 4 were constructed with a total of four plies, with the two outermost plies being the wholly aromatic polyamide paper, and the two inner plies being asbestos. It will be noted from the results of Table II, that the attempt to reduce the material cost of a prior art collar formed entirely of wholly aromatic polyamide paper, by mixing plies of wholly aromatic polyamide paper with plies of low cost asbestos, results in collar having a relatively low compressive strength. On the other hand, when constructing the collars according to the teachings of the invention, using asbestos plies and plies of a fibrous material impregnated with a thermosettable resin which has been advanced to the B-stage, a relatively low cost collar is provided which has the high compressive strength necessary to withstand the short circuit stresses in dry type power transformers.

While the invention has been described using coils having a circular cross-sectional configuration, it is to be understood that the new and improved method is equally applicable to coils of any cross-sectional configuration, such as rectangular.

In summary, there has been disclosed a new and improved method of constructing cylindrical electrical winding assemblies for dry type transformers which must withstand operating temperatures of 220° C., and higher, which method facilitates the manufacturing and assembling of the coils and winding. The coil collars are constructed of a plurality of plies of asbestos and resin impregnated reenforcing material, which resin is in the B-stage, fusible but dry to the touch, subsequently curible by heat to provide an infusible solid. This combination of plies in the collars is thus relatively inexpensive, and it enables the collar to be positioned in the winding assembly while still flexible and easily handled, with the B-stage resin being subsequently cured to form unitary laminated structures when the winding is heated to drive out moisture prior to the varnish dip and bake cycle. Finally, while the collars utilize relatively low cost materials, they provide the required electrical and mechanical strengths across the operating temperature range of high temperature dry type transformers.

We claim:

1. A method of constructing an electrical winding assembly, comprising the steps of:
   providing a winding form,
   cutting a plurality of first plies of like predetermined configuration from a fibrous sheet of insulating material impregnated with a thermosettable resin in a heat fusible stage which is dry to the touch,
   cutting a plurality of second plies having said predetermined configuration from a sheet of asbestos,
   stacking a predetermined number of said first and second plies in a predetermined sequence to provide a first stack having a predetermined build dimension,
   wrapping the first stack about the winding form to provide a first insulating collar,
   winding an insulated electrical conductor about the winding form, to provide a coil assembly having first and second ends, with the first end starting at the first insulating collar,
   stacking a predetermined number of said first and second plies in a predetermined sequence to provide a second stack having a predetermined build dimension,
   wrapping the second stack about the winding form at the second end of the coil assembly, to provide a second insulating collar,
   and heating said first and second insulating collars to cure the heat fusible resin in the first plies to a solid, infusible state.

2. The method of claim 1 including the steps of impregnating the coil assembly, including the first and second insulating collars, with a liquid resinous composition, and curing the resinous composition to an infusible solid.

3. The method of claim 1 wherein the length dimension of the first and second plies is less than the circumferential dimension of the winding form, providing a predetermined gap between the ends of the first and second stacks of plies when the stacks are wrapped about the winding form, and including the steps of forming leads on the first and second ends of the coil assembly by directing the coil conductor through the gap provided in the first and second insulating collars.

4. The method of claim 1 wherein the steps of stacking the first and second plies to form the first and second stacks include placing the first plies at both outer sides of the stack.

5. The method of claim 1 including the steps of taping the first and second stacks to the winding form after the steps of wrapping the first and second stacks about the winding form.

6. The method of constructing an electrical winding assembly, comprising the steps of:
   providing a winding tube,
   cutting a plurality of first plies of like predetermined configuration from a fibrous sheet impregnated with a thermosettable resin which is in the heat fusible B-stage,
   cutting a plurality of second plies having said predetermined configuration from a sheet of asbestos,
   winding an insulated electrical conductor about said winding tube to provide an electrical coil having first and second ends,
   providing first and second insulating collars on said winding tube on the first and second ends of said electrical coil, respectively, with each of said first and second insulating collars including both said first and second plies disposed in stacked, superposed relation, in a predetermined sequence, with the first plies being disposed at the outer sides of the stack,
   and heating said first and second insulating collars to cure the heat fusible resin in said first plies to a non-fusible solid.

7. The method of claim 6 including the steps of impregnating the coil assembly, including the first and second insulating collars, with a liquid thermosettable resinous composition, and curing the resinous composition to a non-fusible solid.

8. The method of claim 6 wherein the length dimension of the first and second plies is less than the circumferential dimension of the winding tube, providing a gap between the ends of the first and second collars, and including the steps of forming leads on the first and second ends of the coil assembly by directing the coil conductor through the gaps provided in the first and second collars.

9. The method of claim 6 including the steps of taping the first and second collars to the winding form, prior to the step of heating the collars to cure the heat fusible resin.

* * * * *